United States Patent
Sharma et al.

(10) Patent No.: US 8,565,432 B2
(45) Date of Patent: Oct. 22, 2013

(54) COMMUNICATIONS SYSTEM

(75) Inventors: Vivek Sharma, London (GB); Keiichi Kubota, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 12/735,390

(22) PCT Filed: Jan. 30, 2009

(86) PCT No.: PCT/JP2009/052010
§ 371 (c)(1),
(2), (4) Date: Jul. 12, 2010

(87) PCT Pub. No.: WO2009/096605
PCT Pub. Date: Aug. 6, 2009

(65) Prior Publication Data
US 2010/0284535 A1    Nov. 11, 2010

(30) Foreign Application Priority Data
Jan. 31, 2008    (GB) .................................. 0801825.1

(51) Int. Cl.
*H04K 1/00*    (2006.01)
(52) U.S. Cl.
USPC ........... 380/270; 380/255; 380/272; 380/274; 380/277; 713/171; 726/2
(58) Field of Classification Search
USPC .......... 380/255, 270, 272, 274, 277; 713/171; 726/2
See application file for complete search history.

(56) References Cited

U.S. PATENT DOCUMENTS

| | | | |
|---|---|---|---|
| 6,741,704 B1 * | 5/2004 | Virtanen | 380/247 |
| 7,907,733 B2 | 3/2011 | Cho et al. | |
| 2003/0035545 A1 * | 2/2003 | Jiang | 380/272 |
| 2003/0076859 A1 | 4/2003 | Jiang | |
| 2004/0038694 A1 * | 2/2004 | Kuo | 455/515 |
| 2004/0039910 A1 * | 2/2004 | Isokangas et al. | 713/171 |
| 2004/0228491 A1 * | 11/2004 | Wu | 380/272 |

(Continued)

FOREIGN PATENT DOCUMENTS

| | | |
|---|---|---|
| CN | 101018392 A | 8/2007 |
| CN | 101106824 A | 1/2008 |

(Continued)

OTHER PUBLICATIONS

3GPP TS 25.331 V8.1.0 (Dec. 2007), 3rd Generation Partnership Project; Technical Specification Group Radio Access Network; Radio Resource Control (RRC); Protocol Specification, Dec. 2007.

(Continued)

*Primary Examiner* — Aravind Moorthy
*Assistant Examiner* — Joseph Pan
(74) *Attorney, Agent, or Firm* — McGinn IP Law Group, PLLC

(57) ABSTRACT

A mobile communications system is proposed in which a two stage procedure is used for setting up Radio Bearers within a mobile communications device and UTRAN. In the first stage, both the mobile device and UTRAN perform ciphering based on an old Start value. In the second stage, the mobile device and UTRAN perform ciphering based on a new Start value. In this way, data communication using the Radio Bearers can start without waiting for the mobile device to confirm completion of the setup procedure.

45 Claims, 7 Drawing Sheets

(56) References Cited

U.S. PATENT DOCUMENTS

| | | | |
|---|---|---|---|
| 2005/0265551 A1* | 12/2005 | Hara | 380/270 |
| 2006/0030294 A1 | 2/2006 | Funnell et al. | |
| 2006/0229102 A1* | 10/2006 | Kitazoe et al. | 455/560 |
| 2007/0263871 A1 | 11/2007 | Maheshwari et al. | |
| 2008/0080713 A1 | 4/2008 | Cho et al. | |
| 2011/0116633 A1* | 5/2011 | Funnell et al. | 380/270 |

FOREIGN PATENT DOCUMENTS

| | | |
|---|---|---|
| EP | 1 657 868 A1 | 5/2006 |
| EP | 1 855 499 A2 | 11/2007 |
| JP | 2007-527178 A | 9/2007 |
| WO | WO 03/047154 A1 | 6/2003 |

OTHER PUBLICATIONS

Chinese Office Action dated Oct. 31, 2012 with English translation thereof.

Chinese Office Action and Search Report dated Jun. 4, 2013 with English translation of Search Report thereof.

* cited by examiner

COMMUNICATIONS SYSTEM

The present application is based on and claims priority from international patent application No. PCT/JP2009/052010, filed on Jan. 30, 2009, which is based on and claims priority from British patent application No. 0801825.1, filed on Jan. 31, 2008, the entire contents of which are incorporated herein by reference.

TECHNICAL FIELD

The present invention relates to mobile telecommunication networks, particularly but not exclusively networks operating according to the 3GPP (3rd Generation Partnership Project) standards or equivalents or derivatives thereof.

BACKGROUND ART

In mobile telecommunication networks, when User Equipment (UE) wants to send data to or receive data from the network, the network initially sends configuration data to the UE so that it can communicate with the network using the correct parameters. The configuration data includes, among other things, when the UE should start to cipher the uplink data it sends to the network (Activation Time). In response to receiving the configuration data, the UE configures its internal resources accordingly and sends a message back to the network confirming that the configuration was successful. The network then starts to cipher downlink data after receiving this confirmation message. However, in practice, this confirmation message may not be sent until after the Activation Time and in this case, any uplink data sent from the UE to the network or downlink data sent from the network to the UE, before the network has received the configuration confirmation message, can not be deciphered properly.

3GPP standard TS 25.331 V8.1.0 (the content of which is incorporated herein by reference) defines how this configuration should be performed in UTRAN (Universal Mobile Telecommunications System (UMTS) Terrestrial Radio Access Network).

The present invention aims to provide an alternative arrangement which will at least alleviate this problem.

DISCLOSURE OF THE INVENTION

According to one aspect, the invention provides a method performed by a communications node at the setup or reconfiguration of a radio bearer, the method comprising: a first communications step of communicating a radio bearer setup message with another communications node; activating the radio bearer at a defined activation time; a second communicating step of communicating a radio bearer setup complete message confirming that the radio bearer has been setup and of communicating new cipher data for use in modifying a cipher input parameter used for ciphering and deciphering data communicated with the other communications node. The ciphering configuration of the radio bearers is completed in a two stage process. In the first stage, between activating the radio bearer and communicating the new cipher data, the method ciphers data to be transmitted by the radio bearer or deciphers data received by the radio bearer using first values of said cipher input parameter. In the second stage, after the new cipher data has been communicated, the method ciphers data to be transmitted by the radio bearer or deciphers data received by the radio bearer using second values of said cipher input parameter generated using said new cipher data.

Typically the activation time will be defined in the radio bearer setup message and the new cipher data will be communicated with the radio bearer setup complete message.

In one embodiment, the first values of the cipher input parameter are generated using previous cipher data communicated with the other communications node prior to said first communicating step, such as during an RRC connection setup procedure. The cipher data can be Start values maintained by one of the communications nodes. This cipher data is not used directly to cipher or decipher the data to be communicated, but are part of the calculation used to determine the values of the cipher input parameter (which may be count-c).

The first and second values of the cipher input parameter may include a transmit cipher input parameter value key for use in ciphering data to be transmitted and a receive cipher input parameter value for use in deciphering received data. These cipher input parameter values may be updated for each data packet communicated using known ciphering techniques.

The method may be performed by a mobile communications device (such as a mobile or cellular telephone), in which case, the first communicating step will be a receiving step and the second communicating step will be a transmitting step. Alternatively, the method may be performed by a network communications node (such as a UTRAN), in which case, the first communicating step will be a transmitting step and the second communicating step will be a receiving step.

In the preferred embodiment both communication nodes preferably do not start ciphering or deciphering data using the modified cipher input parameters until a respective transmit cipher activation time and a receive cipher activation time. The uplink cipher activation time may be different from the downlink cipher activation time. These cipher activation times may be calculated by one or both of the communications nodes and may be defined by a time dependent parameter, such as a system frame number or sequence number of a packet within a sequence of packets to be communicated using the radio bearer. A node which calculates a cipher activation time will have to transmit that information to the other node, so that it knows when to start using the modified cipher input parameters to cipher/decipher the data. The calculation of a cipher activation time can be made based on a data rate defined for the radio bearer (for example in the radio bearer setup message) and an estimated time for the other communications node to be ready to cipher/decipher the data using the modified cipher input parameters.

This aspect of the invention also provides a communications node, such as a mobile device or a network device, that performs the above method.

One embodiment describes a method of configuring a radio bearer within a mobile communications device, the method comprising: receiving control data for configuring the radio bearer and data defining an activation time for activating the configured radio bearer; determining new cipher data for use in ciphering uplink data to be transmitted by the radio bearer; determining a cipher activation time; signalling the determined cipher activation time and the determined new cipher data to a communications node; wherein between said activation time and said cipher activation time, the method further comprises ciphering uplink data for transmission using previous cipher data; and wherein after said cipher activation time, the method comprises ciphering uplink data for transmission using said new cipher data.

Another embodiment describes a method performed by a mobile communications device at setup or reconfiguration of a radio bearer, the method comprising: receiving a radio bearer setup message from a remote communications node, the radio bearer setup message for use in configuring the radio bearer to communicate data with the remote communications node; configuring the radio bearer in accordance with the received radio bearer setup message; activating the configured radio bearer at an activation time defined by the remote communications node; determining new cipher data for use in ciphering data to be transmitted by said radio bearer to said remote communications device; determining a ciphering activation time for uplink data using the new cipher data; transmitting said new cipher data and said cipher activation time to said remote communications device; and ciphering uplink data to be transmitted by said radio bearer, after said cipher activation time using said new cipher data.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

An embodiment of the invention will now be described, by way of example, with reference to the accompanying drawings in which.

BEST MODE FOR CARRYING OUT THE INVENTION

Overview

Figure 1:
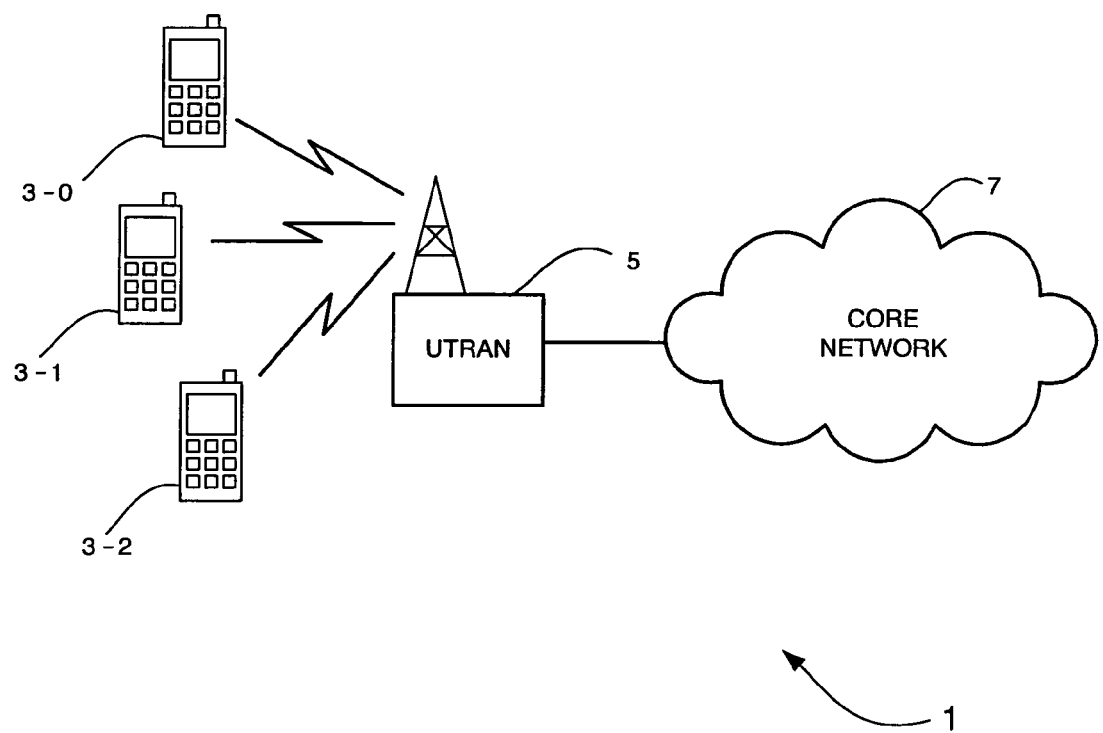
FIG. 1 schematically illustrates a mobile telecommunication system of a type to which the embodiment is applicable.
Figure 2:
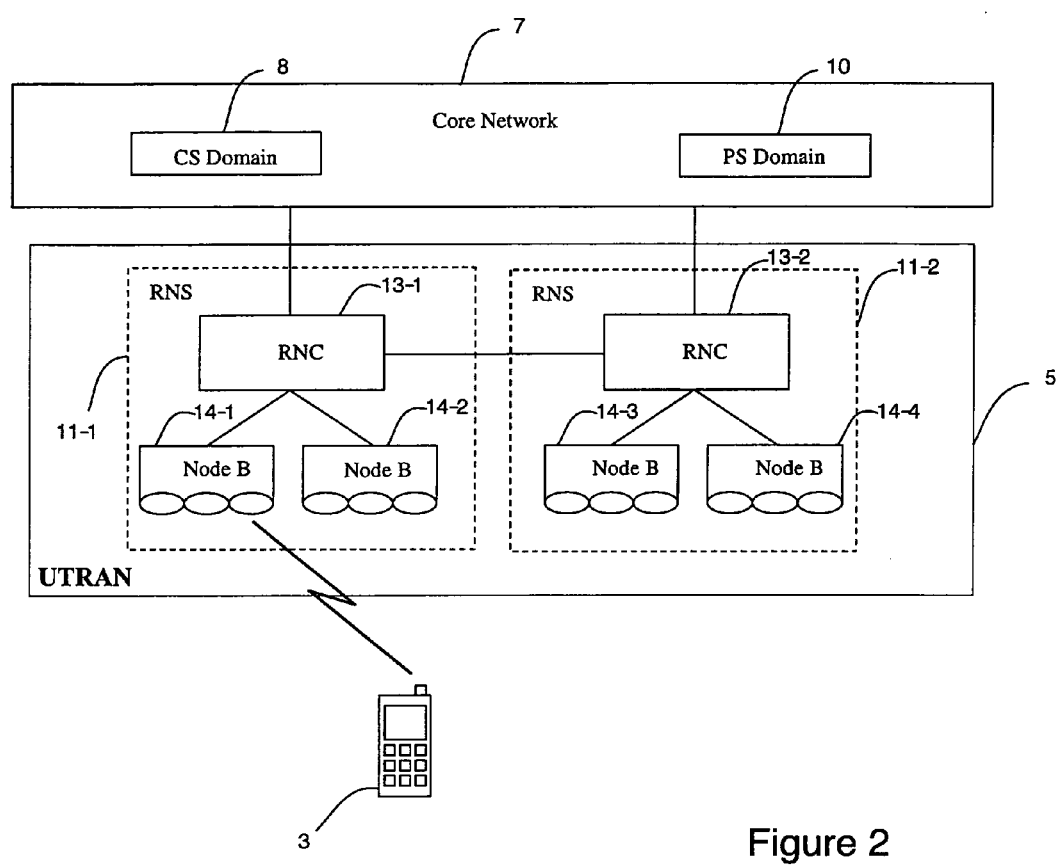
FIG. 2 schematically illustrates the architecture of the UTRAN system.

FIG. 1 schematically illustrates a mobile (cellular) telecommunication system 1 in which users of mobile telephones (MT) 3-0, 3-1, and 3-2 can communicate with other users (not shown) via the UTRAN 5 (Universal Mobile Telecommunications System (UMTS) Terrestrial Radio Access Network) and the core network 7. A number of uplink and downlink communications resources (such as channelisation codes, frequency, sub-carriers, time slots etc) are available for the wireless link between the mobile telephones 3 and the UTRAN 5. In this embodiment, the UTRAN 5 allocates downlink resources to each mobile telephone 3 depending on the amount of data to be sent to the mobile telephone 3. Similarly, the UTRAN 5 allocates uplink resources to each mobile telephone 3 depending on the amount and type of data the mobile telephone 3 has to send to the UTRAN 5.

When data is to be sent between the mobile telephone 3 and the UTRAN 5, the UTRAN 5 sends configuration data to the mobile telephone 3 defining, among other things, the Activation Time for the new configuration to take effect. As will be described in more detail below, the mobile telephone 3 sets up the internal resources in accordance with the received configuration data and sends a configuration confirm message when completed. In this embodiment, at least between the Activation Time and the time that the mobile telephone 3 sends the configuration complete message, both the mobile telephone 3 and the UTRAN 5 use previous ciphering data (Start value) so that uplink and downlink data can still be transmitted and received before the configuration complete message is received by the UTRAN 5.

Protocols

Figure 3:
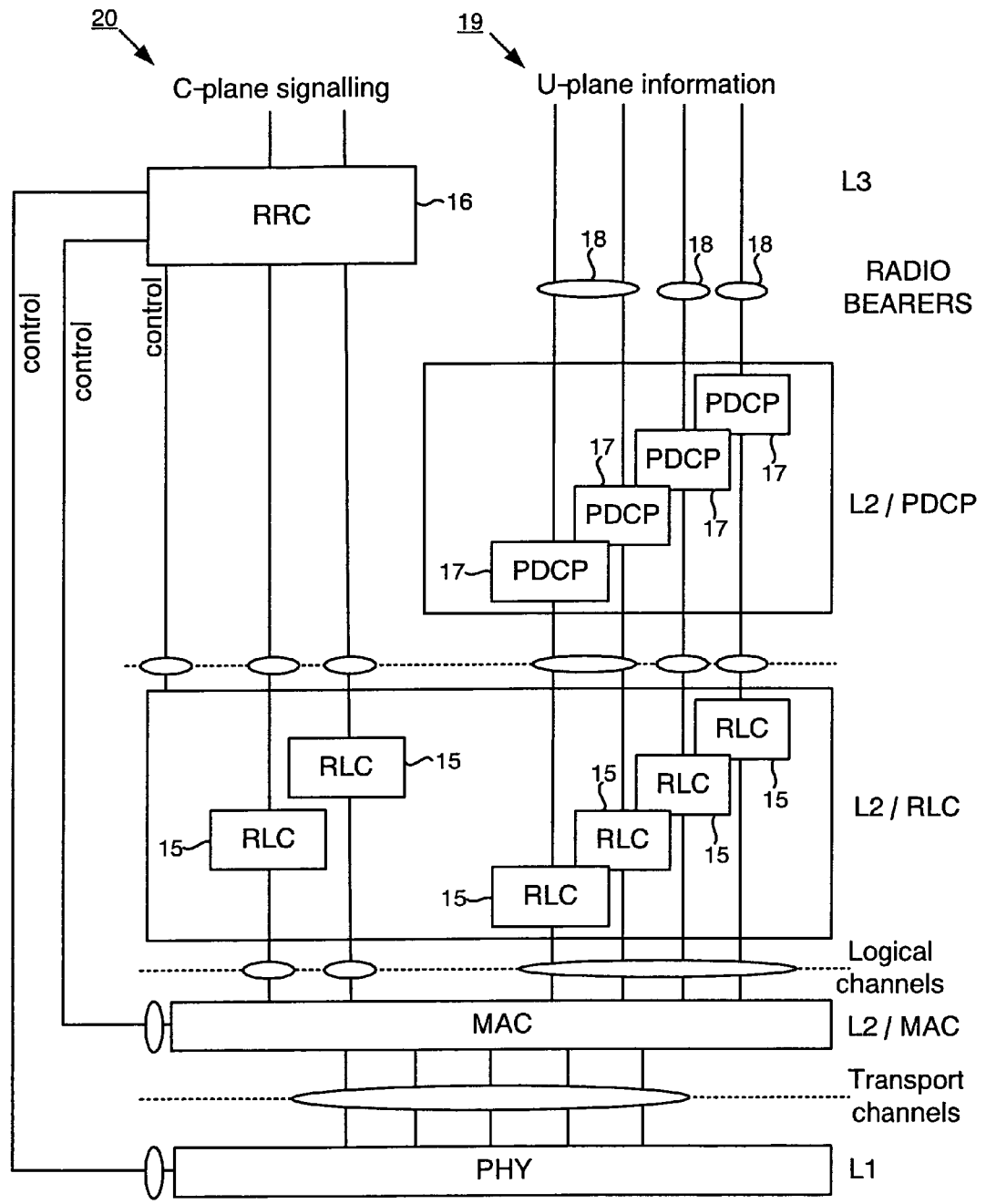
FIG. 3 illustrates three layers of a protocol stack used in the mobile communication device and the UTRAN shown in FIG. 1.

FIG. 3 illustrates part of a protocol stack (lower three layers) used in the mobile telephones 3 and the UTRAN 5. The first layer is the physical layer (L1) which is responsible for the actual transmission of the data over the radio communication channel. Above that is the second layer (L2), which is divided into three sub-layers—the Medium Access Control layer (L2/MAC) which is responsible for controlling access to the air interface; the RLC layer (L2/RLC) which is responsible for concatenation and segmentation of data packets, ciphering and deciphering of data packets; the acknowledgment of packets and the re-transmission of data packets where necessary; and the PDCP layer (L2/PDCP) which is responsible for header compression. Above the second layer is the Radio Resource Control (RRC) layer (L3/RRC) that is responsible for controlling radio resources used in the air interface between the UTRAN 5 and the mobile telephone 3.

The U-plane 19 handles user data transport between the mobile telephone 3 and the UTRAN 5, whereas the C-plane 20 handles transport for signalling data between the mobile telephone 3 and the UTRAN 5. As shown, the L2/RLC layer includes a number of RLC entities 15 used to manage the transmission of C-plane data and U-plane data and the L2/PDCP layer includes PDCP entities 17 used to process the U-plane data.

FIG. 3 also shows radio bearers 18 that assigned to different sources of data to be transmitted/received. Several software applications may be operating at the same time and each application may be sending and/or receiving data. A respective radio bearer would be associated with each task and some radio bearers are assigned higher priority than others. For example, radio bearers assigned to real time services will be assigned higher priority than those assigned to non-real time services. As illustrated in FIG. 3, separate radio bearers 18 are provided for control plane data signalling. The communication resources allocated by the UTRAN 5 for the uplink are shared between the radio bearers 18, depending on their assigned priorities and data rates.

The RRC 16 in the mobile telephone 3 is responsible for setting up and configuring all radio bearers 18 between the UTRAN 5 and the mobile telephone 3. A number of configuration procedures are available to the RRC 16 to setup and configure radio bearers 18. These configuration procedures require the UTRAN 5 to send a specific message to the mobile telephone 3, and the mobile telephone 3 to respond in turn with a corresponding message. Generally speaking, these messages are transmitted via signalling radio bearers 18. The messages include "Radio Bearer Setup" and "Radio Bearer Reconfiguration", among others. For each of these messages, the mobile telephone 3 has a corresponding "Complete" or "Failure" response message indicating success or failure of the procedure on the mobile telephone 3, and which may provide the UTRAN 5 with any necessary information for the UTRAN 5 to complete the procedure. In addition, the configuration messages and the response messages may carry optional information elements (IEs), which are fields of data that hold auxiliary information.

SNs, HFNs and the Start List

As discussed above, in operation the mobile telephone 3 communicates with the UTRAN 5 over a plurality of radio bearers 18. Each radio bearer 18 in the mobile telephone 3 will have a receive buffer (not shown) for holding protocol data units (PDUs) received from the corresponding radio bearer of the UTRAN 5 and a transmit buffer (not shown) for holding PDUs that are awaiting transmission to the corresponding radio bearer of the UTRAN 5. Typically, each radio bearer 18 will maintain a transmit sequence number (SN) that is incremented for each new PDU added to the transmit buffer; and a receive sequence number (SN) that is incremented each time a PDU is received in the receive buffer. The transmit sequence number is included in the header of the corresponding PDU and indicates the sequential ordering of the transmitted PDUs. Therefore, the receiving side can scan the sequence numbers embedded within the received PDUs to determine the sequential ordering of the PDUs, and to determine if any PDUs are missing. If operating in Acknowledge Mode (AM) then the receiving side can send a message to the transmitting side indicating which PDUs were received by using the sequence numbers of each received PDU, or may request that a PDU be retransmitted by specifying the sequence number of the PDU to be retransmitted.

Each sequence number is defined by an n-bit number (typically a 7-bit number) and so the SN will therefore rollover every $2^n$ PDUs. Hyper-frame numbers (HFNs) are also maintained by the mobile telephone 3 and the UTRAN 5. These HFNs can be thought of as high-order bits (i.e. MSBs) of the corresponding sequence numbers and are not normally transmitted with the PDUs. Each radio bearer 18 of the mobile telephone 3 has a receiving hyper-frame number ($HFN_R$) and a transmitting hyper-frame number ($HFN_T$). Similarly, the corresponding radio bearer on the UTRAN 5 will have an $HFN_R$ and an $HFN_T$. When the mobile telephone 3 detects rollover of the receive sequence number for PDUs in the receive buffer, the mobile telephone 3 increments the $HFN_R$. Similarly, on rollover of the sequence number for transmitted PDUs, the mobile telephone 3 increments the $HFN_T$. A similar process occurs on the UTRAN 5.

In this embodiment, when the radio bearer 18 is initially setup, the RLC sequence numbers are incremented from a starting value of zero. The HFNs on the other hand are initialised to a starting value defined by a start list (not shown) stored in non-volatile memory of the mobile telephone 3 (typically in the USIM). The start list maintains a separate Start value for CS domain traffic and PS domain traffic. When the mobile telephone 3 is powered up, this start list is transmitted to the UTRAN 5 so that when each new radio bearer is setup, the HFNs in both the mobile telephone 3 and the UTRAN 5 can be initialised to the same value. This is important because the HFNs and the RLC SNs are used in the ciphering and deciphering of transmitted and received PDUs.

UTRAN

Figure 4:
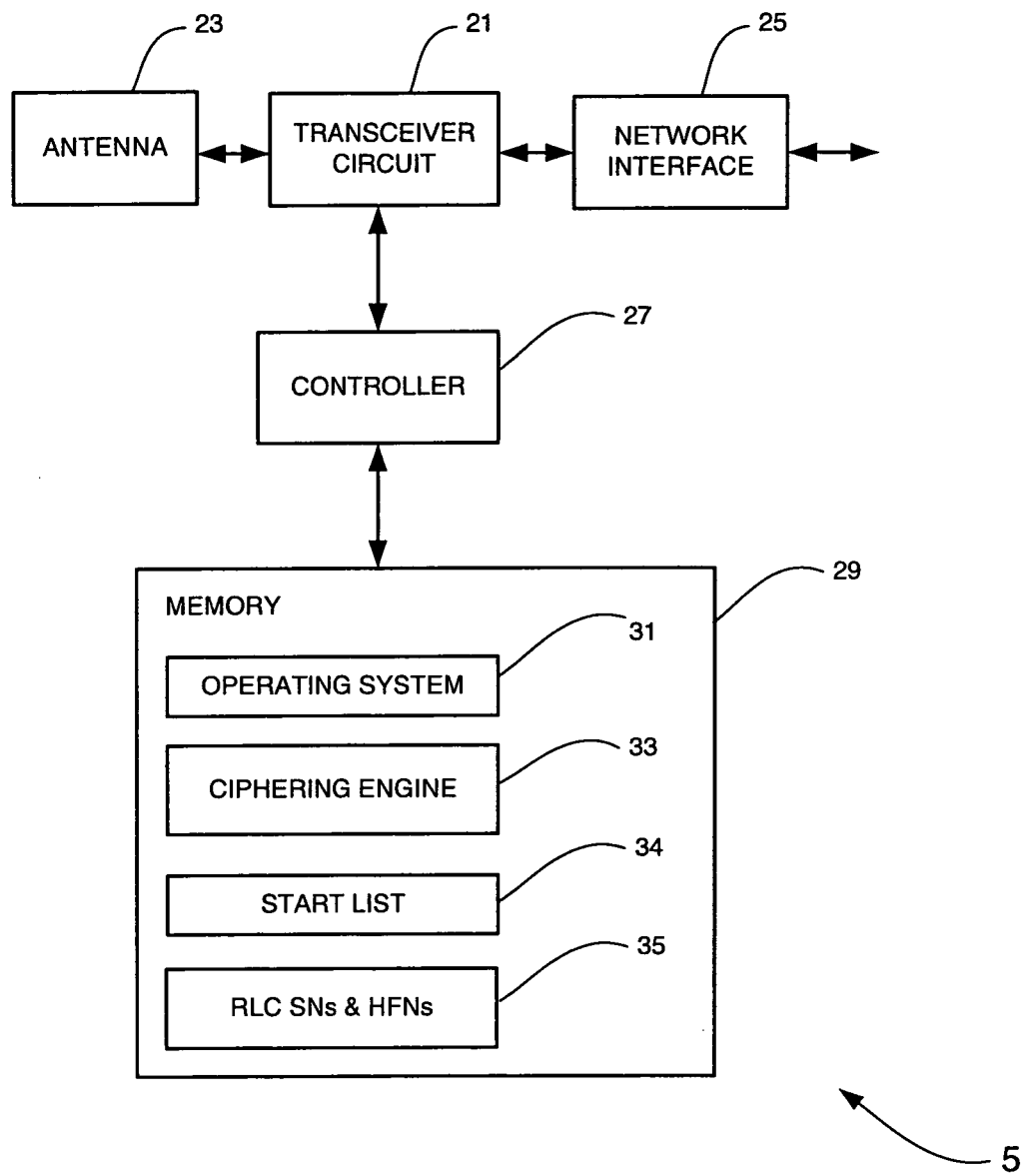
FIG. 4 schematically illustrates the UTRAN forming part of the system shown in FIG. 1.

FIG. 4 is a block diagram illustrating the main components of the UTRAN 5 used in this embodiment. As shown, in this embodiment, the RNC functionality and the base station functionality are implemented by a single device. As shown, the UTRAN 5 includes a transceiver circuit 21 which is operable to transmit signals to and to receive signals from the mobile telephones 3 via one or more antennae 23 and which is operable to transmit signals to and to receive signals from the core network 7 via a network interface 25. A controller 27 controls the operation of the transceiver circuit 21 in accordance with software stored in memory 29. The software includes, among other things, an operating system 31 and a ciphering engine 33. The memory also includes: for each mobile telephone 3, a start list 34; and for each associated mobile telephone 3 and each radio bearer, transmit and receive sequence numbers (SNs) and Hyper Frame Numbers (HFNs) 35. The ciphering engine 33 is operable to cipher the downlink data to be sent to, and to decipher the uplink data received from, the mobile telephone 3, using a ciphering algorithm that has many input parameters including a ciphering key, a bearer ID, a direction, a count-c value etc. In this embodiment, the ciphering algorithm uses these input parameters to determine a keystream block, which is used to cipher the plain text user data. The count-c input parameter is calculated from the relevant HFN and SN.

Mobile Telephone

Figure 5:
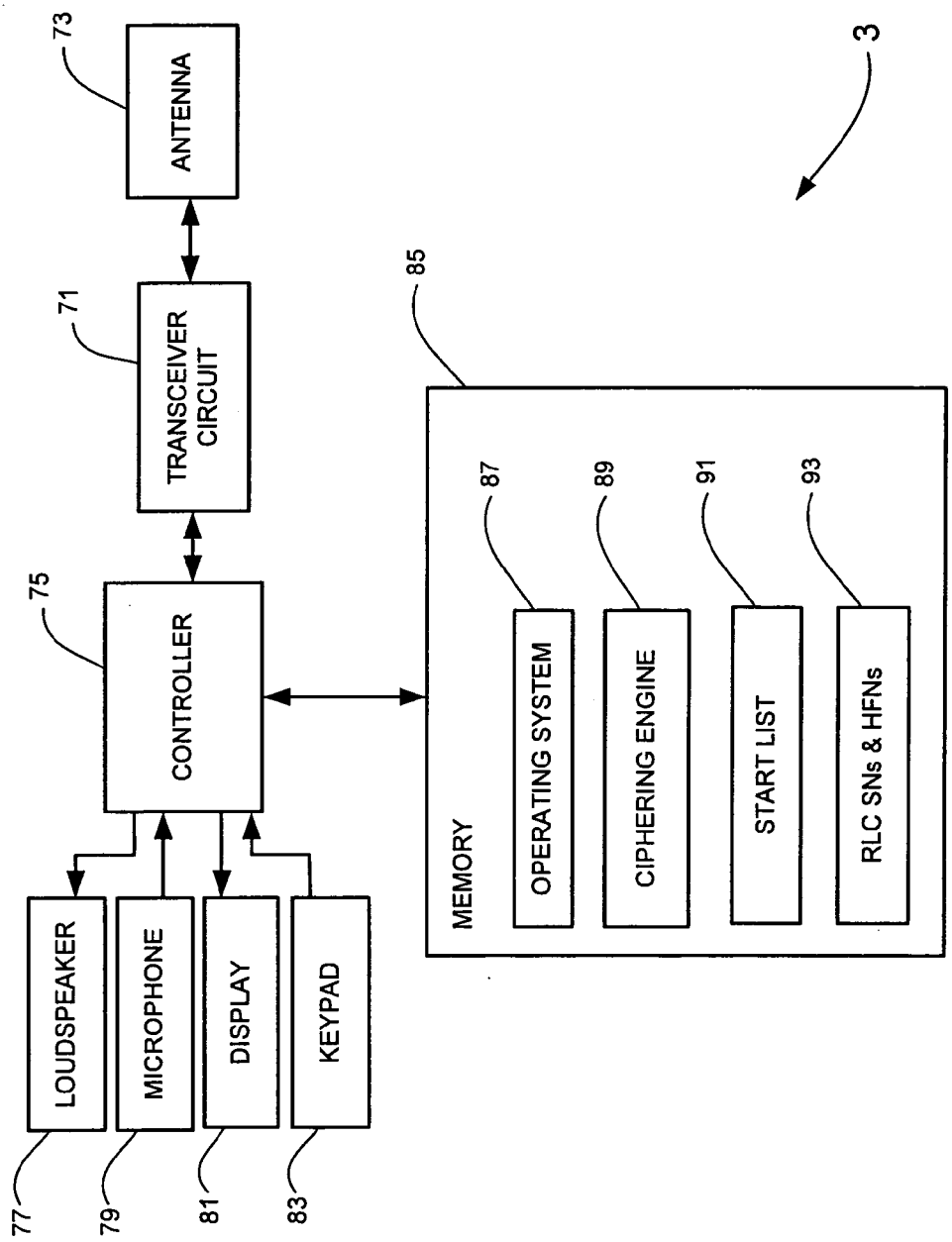
FIG. 5 schematically illustrates a mobile communication device forming part of the system shown in FIG. 1.

FIG. 5 is a block diagram illustrating the main components of each of the mobile telephones 3 shown in FIG. 1. As shown, the mobile telephones 3 include a transceiver circuit 71 that is operable to transmit signals to and to receive signals from the UTRAN 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a ciphering engine 89. The memory 85 also includes the start list 91 for the mobile telephone 3 and the current transmit and receive Sequence Numbers and Hyper Frame Numbers 93. Typically, the start list 91 will be stored in non-volatile memory such as in the SIM card (not shown). The ciphering engine 89 is operable to cipher the uplink data to be sent to, and to decipher the downlink data received from, the UTRAN 5, using the same ciphering algorithm as the UTRAN 5.

In the above description, the UTRAN 5 and the mobile telephones 3 are described for ease of understanding as having a number of discrete modules (such as the ciphering engines 33 and 89). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Ciphering for CS Voice Over HSPA

First Embodiment

Figure 6:
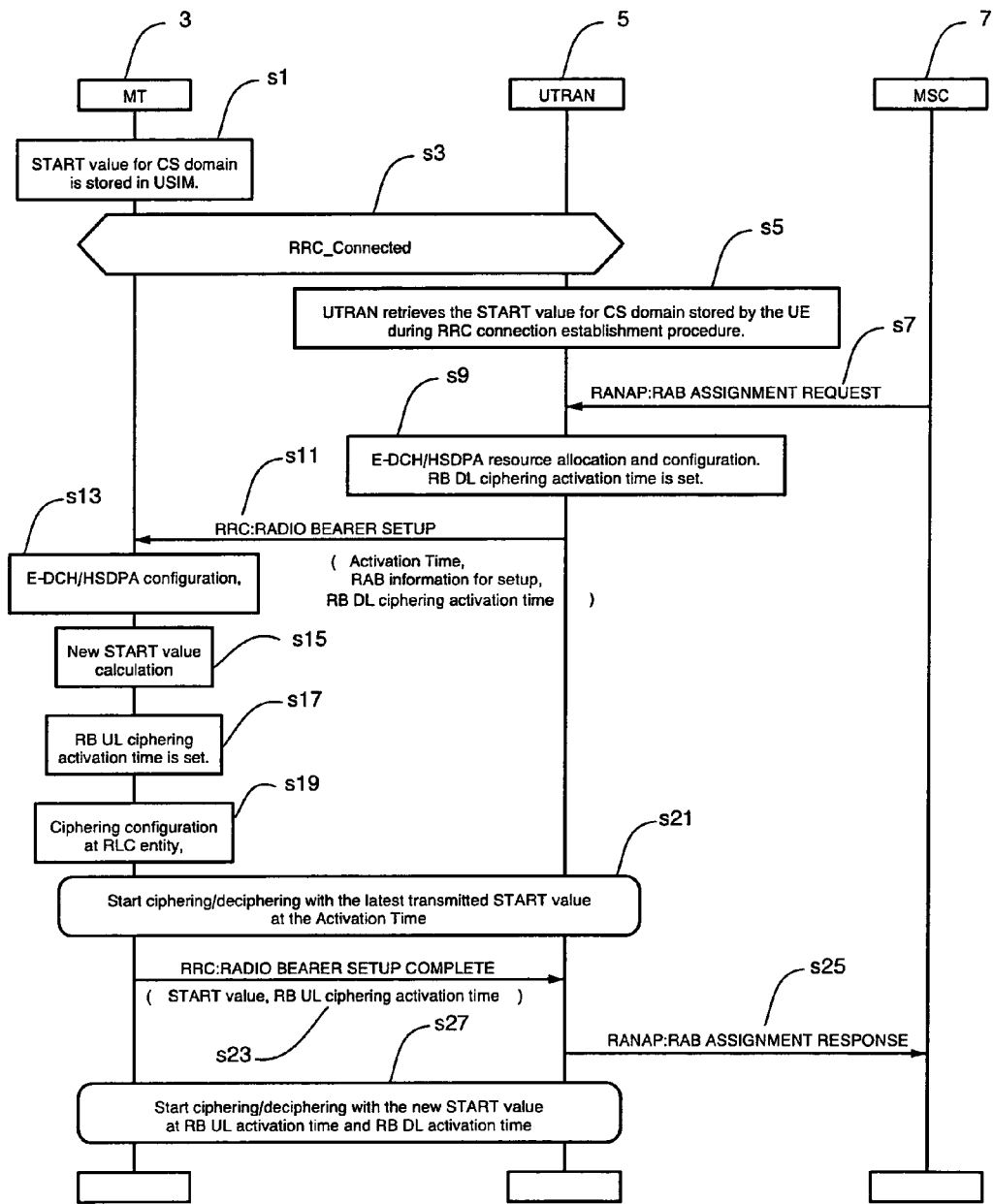
FIG. 6 illustrates one way in which configuration data may be exchanged between the mobile communication device shown in FIG. 5 and the UTRAN shown in FIG. 4.

FIG. 6 is a flow diagram illustrating a first proposal for the exchange of data during the setup procedure for Radio Bearers that will carry CS voice data between the mobile telephone 3 and the UTRAN 5 over HSPA (High Speed Packet Access). As shown, the Start value for the CS domain is stored (step s1) in the mobile telephone 3, in this case, in the USIM module (not shown). The mobile telephone 3 and the UTRAN 5 enter an "RRC_Connected" mode, in step s3, following an RRC connection establishment procedure. As illustrated in step s5, during this RRC connection establishment procedure, the UTRAN 5 retrieves the Start value for the CS domain from the mobile telephone 3. In step s7, the UTRAN 5 receives from an MSC (Mobile Switching Centre which forms Part of the CS domain 8 of the Core network 7) a RAB (Radio Access Bearer) ASSIGNMENT REQUEST, identifying the RABs to be setup or modified. The UTRAN 5 then processes the received request in step s9 and determines the appropriate resource allocation and configuration data. In this embodiment, the UTRAN 5 also determines the RB DL ciphering activation time and the Activation Time in step s9. The Activation Time defines when the mobile telephone 3 and the UTRAN 5 will start to use the new Radio Bearer configuration. The Activation Time is defined by a system frame number (CFN—Connection Frame Number), such that when the mobile telephone receives that CFN it activates the new configuration. The RB DL ciphering activation time defines when the UTRAN 5 will start to cipher the downlink data using a new keystream block generated as a result of changing the count-c value (cipher input parameter) using a new Start value that will be received from the mobile telephone 3. The RB DL ciphering activation time is defined in terms of an RLC sequence number (SN) for the downlink data. As mentioned above, when the radio bearer is setup, the RLC SN for downlink data will be initialised to zero and is incremented for each RLC PDU that is transmitted. In this embodiment, the RB DL ciphering activation time identifies the sequence number of the first RLC DL PDU that will be ciphered with the new keystream block.

In step s11, the UTRAN 5 sends the mobile telephone 3 the RRC: RADIO BEARER SETUP message. This message includes, in separate Information Elements (IEs), the Activation Time, the RAB information for setup and the RB DL ciphering activation time. In response, the RRC layer 16 of the mobile telephone 3 configures the relevant Radio Bearer 18 in step s13. In step s15, the RRC layer 16 in the mobile telephone 3 determines a new Start value in the manner defined by 3GPP standard TS25.331, section 8.5.9. The RRC layer 16 of the mobile telephone 3 then determines, in step s17, the RB UL ciphering activation time defining when the mobile telephone 3 will start ciphering uplink data using a new keystream block generated as a result of changing the count-c value using the new Start value determined in step s15. Like the RB DL ciphering activation time, the RB UL ciphering activation time identifies the sequence number (SN) of the first RLC UL PDU that will be ciphered with the new keystream block.

In step s19, the RRC layer 16 configures the corresponding RLC entity 15 so that it can perform, in step s21, ciphering of uplink data and deciphering of downlink data using the keystream blocks generated from the old count-c value derived using the old Start value transmitted to the UTRAN at step s5, from the Activation Time defined in the Radio Bearer Setup message. Similarly, in step s21, the UTRAN 5 activates (at the Activation Time) the corresponding radio bearer so that it starts ciphering downlink data and deciphering uplink data using the keystream block generated using the old count-c value using the old Start value transmitted to the UTRAN at step s5.

Subsequently, at step s23, the RRC layer 16 sends the UTRAN 5 a RRC:RADIO BEARER SETUP COMPLETE message, which includes the new Start value (determined in step s15) and the RB UL ciphering activation time. In response, the UTRAN 5 sends, in step s25, a RAB ASSIGNMENT RESPONSE message to the MSC confirming the successful configuration of the Radio Bearers. Finally, in step s27, the mobile telephone 3: i) starts ciphering its uplink data using the new uplink (transmit) keystream block generated as a result of changing the count-c value using the new Start value (determined in step s15), when the RLC UL SN reaches the number defined by the RB UL ciphering activation time; and ii) starts deciphering the received downlink data using the new downlink (receive) keystream block generated as a result of changing the count-c value using the new Start value, when the RLC DL SN reaches the number defined by the RB DL ciphering activation time; and the UTRAN 5: i) starts ciphering its downlink data using the new downlink (transmit) keystream block generated as a result of changing the count-c value using the new Start value when the RLC DL SN reaches the number defined by the RB DL ciphering activation time; and ii) starts deciphering the received uplink data using the new uplink (receive) keystream block generated as a result of changing the count-c value using the new Start value when the RLC UL SN reaches the number defined by the RB UL ciphering activation time.

As those skilled in the art will appreciate, the advantage of the embodiment described above is that the mobile telephone 3 and the UTRAN 5 can exchange data at least between the Activation Time and the time that the RRC:RADIO BEARER SETUP COMPLETE message is sent to the UTRAN 5. However, as those skilled in the art will appreciate, this embodiment ideally requires both the mobile telephone 3 and the UTRAN 5 to be able to estimate accurately when they will each be able to use the new Start value and the corresponding RLC SN to which this will correspond. As the RLC SNs are incremented based on traffic flow, this ideally requires them to estimate, as accurately as possible, the codec rate, channel conditions etc., which is complicated further by the segmentation which is performed in the L2/MAC layer.

Additionally, it should be noted that as the RLC SNs are 7 bits long, rollovers can happen, depending on the codec rate. If the time difference between the Activation Time and the time defined by the RB DL ciphering activation time, contains more than one RLC SN rollover, then the RRC: RADIO BEARER SETUP message will require an additional IE to indicate the number of rollovers. This is similarly true for the RRC: RADIO BEARER SETUP COMPLETE message if the time difference between the Activation Time and the time defined by the RB UL ciphering activation time, contains more than one RLC SN rollover.

Ciphering for CS Voice Over HSPA

Second Embodiment

Figure 7:
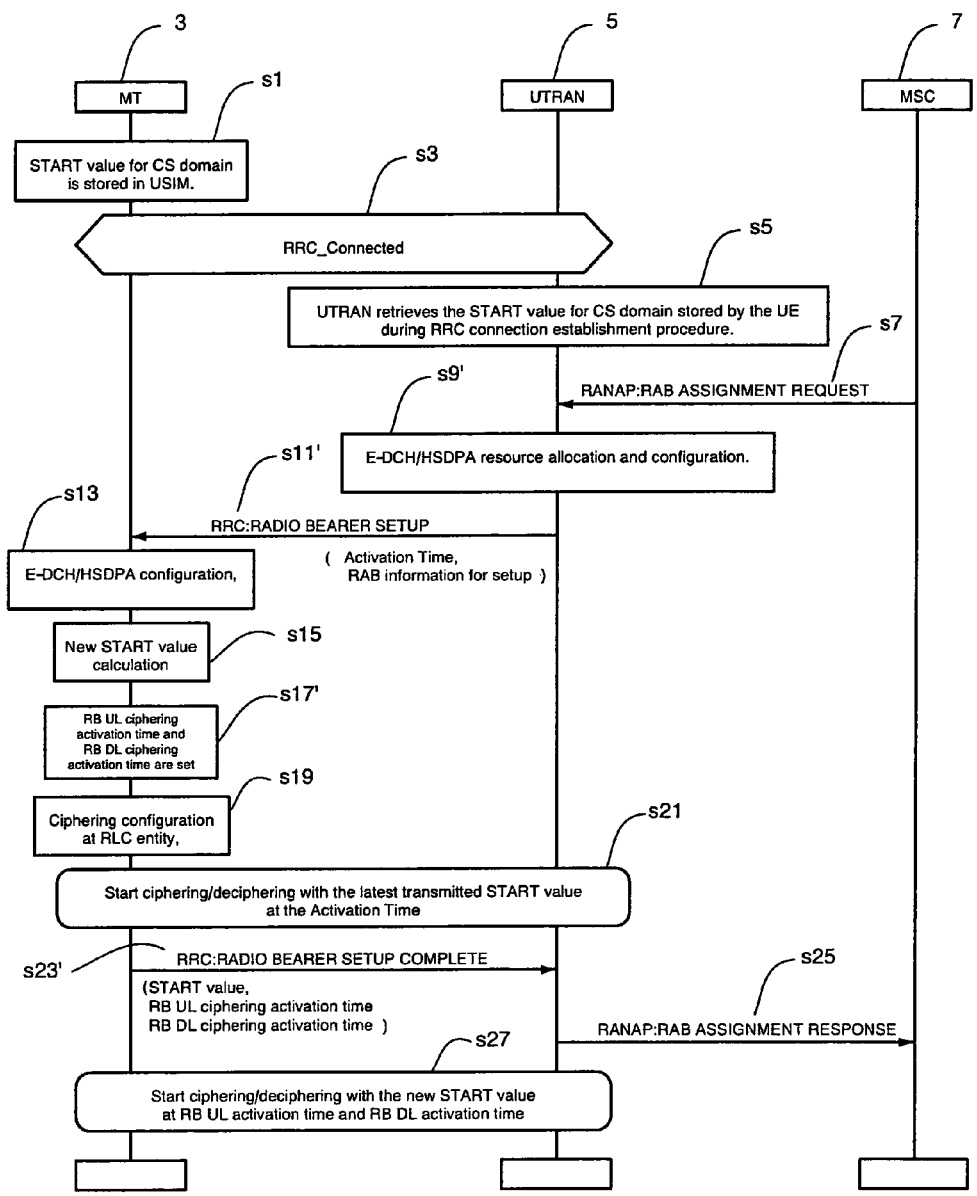
FIG. 7 illustrates another way in which configuration data may be exchanged between the mobile communication device shown in FIG. 5 and the UTRAN shown in FIG. 4.

FIG. 7 is a flow diagram illustrating a second proposal for the exchange of data during the setup procedure for Radio Bearers that will carry CS voice data between the mobile telephone 3 and the UTRAN 5 over HSPA (High Speed Packet Access). The main difference between this proposal and the first proposal is that in this proposal, the mobile telephone 3 determines both the RB UL ciphering activation time and the RB DL ciphering activation time, which are then signalled to the UTRAN 5. As can be seen by comparing FIGS. 6 and 7, this results in modified steps: s9' (where the UTRAN 5 does not calculate the RB DL ciphering activation time); s11' (where the RRC:RADIO BEARER SETUP message does not include the RB DL ciphering activation time); s17' (where the mobile telephone 3 calculates the RB DL ciphering activation time); and s23' (where the mobile telephone 3 transmits the RRC:RADIO BEARER SETUP COMPLETE message together with the calculated RB DL ciphering activation time as well as the new Start value and the RB UL ciphering activation time). The remaining steps are unchanged and will not be described again.

As those skilled in the art will appreciate, one advantage with this embodiment is that the risk of DL RLC SN rollover between the Activation Time and the RB DL ciphering activation time is reduced (compared with the first proposal discussed above). This is because, in the first embodiment, the UTRAN 5 had to estimate when it would receive the new Start value which is outside of its direct control. Therefore, to ensure proper operation, the UTRAN 5 will have to overestimate how long it will take before it is ready to cipher using the new Start value. In contrast, as it is the mobile telephone 3 that determines the new Start value, it will be able to calculate more accurately when it and the UTRAN 5 will be able to start ciphering using the new Start value. The mobile telephone 3 can therefore define a shorter time period between the Activation Time and the RB DL ciphering activation time.

When calculating the ciphering activation RLC-SN, the mobile telephone 3 will consider that it will take at least one Transmission Time Interval (TTI) to schedule the RRC:RADIO BEARER SETUP COMPLETE message plus the round trip time/2 (one way communication link time) plus the internal time that UTRAN will take to process the message. As there is a possibility that the TTI may be either 2 msec or 10 msec for HSPA, if the 2 msec TTI is used, then the RRC: RADIO BEARER SETUP COMPLETE message can reach the UTRAN 5 faster and the new configuration can also become active faster.

Modifications and Alternatives

A detailed embodiment has been described above. As those skilled in the art will appreciate, a number of modifications and alternatives can be made to the above embodiment whilst still benefiting from the inventions embodied therein. By way of illustration only a number of these alternatives and modifications will now be described.

In the above embodiment, if more than 127 RLC PDUs are transmitted (either the mobile telephone 3 or the UTRAN 5) before the ciphering activation time, then the corresponding HFN will be incremented to reflect the rollover. Ultimately, for the currently proposed UTRAN standard it is unlikely that there will be a rollover during this initial period as 127 RLC PDUs is likely to correspond to approximately 2.5 seconds and it is expected that the mobile telephone 3 and the UTRAN will be using the new Start value well before a rollover can happen. Nonetheless, to maintain consistency with CS voice over DCH (where rollover is far more likely), the standard may define that HFNs are not incremented during this initial period.

In the second embodiment described above, the mobile telephone 3 determined the ciphering activation time for both the uplink and the downlink. In another embodiment, the UTRAN may be arranged to determine the ciphering activation time for both the uplink and the downlink and signal these to the mobile telephone with the RRC: RADIO BEARER SETUP message.

In the above embodiments, the ciphering was changed based on an updated Start value. As those skilled in the art will appreciate, in systems where such Start values are not used or stored, some other UE supplied data may be used instead to control the changing of the ciphering between the two stages.

In the above embodiments, the ciphering activation times were defined by an RLC SN. In an alternative embodiment, the activation times may be defined by some other time dependent parameter, such as by a CFN number.

The above embodiments describe techniques for setting up radio bearers for CS voice over HSPA. As those skilled in the art will appreciate, the above techniques could also be used for other types of CS data and for PS data as well.

In the above two embodiments, the RAB setup message was used for setting up new radio bearers for carrying CS voice data over HSPA. The present invention can also be applied to the case where the radio bearer(s) are already setup and they are being re-configured. For example, the original radio bearers may be initially configured to carry the CS traffic over DCH (because the mobile telephone is currently in a cell that only provides DCH service) and then moves into a cell configured to provide HSPA service. In this case, higher layers will be continuously sending data and the switching of transport channels will happen at lower layers. The techniques described above can be used to take care of ciphering during this transition period. The procedure is the same as UTRAN 5 sending RRC: RADIO BEARER SETUP message and the mobile telephone 3 responding with an RRC: RADIO BEARER SETUP COMPLETE message, except the trigger is not only the RAB assignment request message, but also a trigger caused by the change of cell. As those skilled in the art will realize, other reconfiguration situations may be triggered by other trigger events.

In the above embodiment, a mobile telephone based telecommunications system was described. As those skilled in the art will appreciate, the techniques described in the present application can be employed in any communications system. In particular, many of these techniques can be used in wire or wireless based communications systems which either use electromagnetic signals or acoustic signals to carry the data. In the general case, the UTRAN and the mobile telephones can be considered as communications nodes or devices which communicate with each other. Other communications nodes or devices may include user devices such as, for example, personal digital assistants, laptop computers, web browsers, etc.

In the above embodiments, a number of software modules were described. As those skilled will appreciate, the software modules may be provided in compiled or un-compiled form and may be supplied to the UTRAN or to the mobile telephone as a signal over a computer network, or on a recording medium. Further, the functionality performed by part or all of this software may be performed using one or more dedicated hardware circuits. However, the use of software modules is preferred as it facilitates the updating of UTRAN 5 and the mobile telephones 3 in order to update their functionalities.

Various other modifications will be apparent to those skilled in the art and will not be described in further detail here.

Glossary of 3GPP Terms
NodeB—UTRAN base station
CN—Core Network
UE—User Equipment—mobile communication device
DL—downlink—link from base to mobile
UL—uplink—link from mobile to base
UPE—User Plane Entity
RNS—Radio Network Subsystem
RLC—Radio Link Control
RRC—Radio Resource Control
PDCP—Packet Data Convergence Protocol
C-plane—Control Plane
U-plane—User Plane
HSPA—High Speed Packet Access
CFN—Connection Frame Number
CS—Circuit Switched
PS—Packet Switched
SN—Sequence Number
DCH—Dedicated Channel
PDU—Protocol Data Unit
TTI—Transmission Time Interval
RAB—Radio Access Bearer
USIM—Universal Subscriber Identity Module
IE—Information Element
HFN—Hyper Frame Number The following is a detailed description of the way in which the present inventions may be implemented in the currently proposed 3GPP UTRAN standard. Whilst various features may be described as being essential or necessary, this may only be the case for the proposed 3GPP standard, for example due to other requirements imposed by the standard. These statements should not, therefore, be construed as limiting the present invention in any way.

Two Stage Ciphering for CS Voice Over HSPA

CS voice over HSPA uses RLC-UM radio bearer and ciphering for RLC-UM radio bearers is currently performed inside RLC layer. Ciphering for Uplink is started at activation time and started for downlink after UTRAN receives RRC complete message from the UE. So any data received at UTRAN between activation time and receipt of RRC reconfiguration response message cannot be deciphered properly. We propose following three proposals to solve this problem. This applies to CS voice over HSPA setup and reconfiguration from DCH to HSPA.

Proposed Changes

Motivation Behind this Invention:

If user data is required to be encrypted, ciphering for the radio bearer using RLC-UM transferring the use data is performed in the RLC sub-layer. The ciphering algorithm used for the encryption requires some input parameters. One of the input parameter is COUNT-C value, which is ciphering sequence number and 32-bit long.

The COUNT-C value is initialised with START value upon the radio bearer establishment. The START value is calculated by UE and it's informed from UE to UTRAN during the radio bearer establishment procedure.

The radio bearer is required to start using the COUNT-C value initialised by the START value calculated during the radio bearer establishment procedure for ciphering from $1^{st}$ RLC PDU to be transmitted and for deciphering from $1^{st}$ received RLC PDU.

This existing radio bearer establishment procedure with ciphering configuration has the following problems.

UE and UTRAN establish the radio bearer and allocate and configure corresponding resource and entity at activation time, which is sent from UTRAN to UE by RRC: RADIO BEARER SETUP message and indicate when UE and UTRAN shall start using the new configurations given by the RRC message. At this point, the radio bearer is not suspended nor stopped. Therefore the radio bearer can transfer user data. However for the ciphering configuration, UE and UTRAN need to use the same START value and the START value is sent from UE to UTRAN by using RRC: RADIO BEARER SETUP COMPLETE message, and the RRC message is sent after the activation time. It means that there is a time gap that UE and UTRAN cannot perform valid ciphering nor valid deciphering from the activation time and reception of RRC: RADIO BEARER SETUP COMPLETE message at UTRAN.

This current mechanism specified 3GPP spec prohibits to transfer user data during that time period.

This invention introduces two stages ciphering to enable UE and UTRAN to start user data transfer with valid ciphering.

[Proposal 1]

1. UTRAN provides new configuration in RRC reconfiguration message with RB DL activation time information IE, which includes RLC UM SN, indicating when UTRAN uses the new START value for ciphering. Please note that new IE "RB DL activation time information" is proposed in RRC reconfiguration message.

2. UE receives the RRC reconfiguration message.

2.1 UE caclulates new START value and decides when UE starts using the new START value (i.e. defines RB UL activation time). UE puts the new START value and RB UL activation time in RRC reconfiguration complete message.

2.2 UE starts using the given new configurations and starts ciphering and deciphering by using the old START value at the activation time (not ciphering activation time). At this point, UTRAN also starts using the new configurations and starts ciphering and deciphering by using the old START value at the activation time. (NOTE1)

2.3 UE sends the RRC reconfiguration complete message to UTRAN.

3. UTRAN receives the RRC reconfiguration complete message. UTRAN gets the new START value and RB UL activation time. UE starts deciphering by using the new START value when DL RLC SN reaches the RB DL activation time given by the RRC reconfiguration message and starts ciphering by using the new START value when UL RLC SN reaches the RB UL activation time transmitted in the RRC reconfiguration complete message. Likewise for UTRAN.

Pros:

1. Ciphering is active during the time activation time and RRC reconfiguration message is received.

Cons:

1. RLC-SN counter is incremented based on the traffic. So before deciding UL and DL RLC-SN the corresponding entity must ideally estimate as accurately as possible, the codec rate, channel conditions etc. this becomes more complicated with the introduction of variable RLC-PDU size and segmentation inside MAC layer.

2. RLC-SN is 7 bits long and rollovers can be frequent, depending on the codec rate. If time difference between sending of RRC: RADIO BEARER Setup message and start of ciphering indicated by DL RLC-SN contains more than one cycle of RLC-SN rollover then additional IE is required to indicate the number of rollovers.

3. ASN.1 need to be modified.

[Proposal 2]

1. UTRAN provides new configuration in RRC reconfiguration message with activation time information IE. Please note, no new IE is required.

2. UE receives the RRC reconfiguration message.

2.1 UE caclulates new START value and decides when UE starts using the new START value (i.e. defines RB UL activation time and RB DL activation time). UE puts the new START value, RB UL activation time and RB DL activation time in RRC reconfiguration complete message.

2.2 UE starts using the given new configurations and starts ciphering and deciphering by using the old START value at the activation time (not ciphering activation time). At this point, UTRAN also starts using the new configurations and starts ciphering and deciphering by using the old START value at the activation time. (NOTE 1)

2.3 UE sends the RRC reconfiguration complete message to UTRAN.

3. UTRAN receives the RRC reconfiguration complete message. UTRAN gets the new START value, RB UL activation time and RB DL activation time. UE starts deciphering by using the new START value when DL RLC SN reaches the RB DL activation time and starts ciphering by using the new START value when UL RLC SN reaches the RB UL activation time, transmitted in the RRC reconfiguration complete message.

4. UTRAN will start deciphering using new START value, when UL RLC SN reaches RB UL activation time and starts ciphering when DL RLC-SN reaches RB DL activation time.

Pros:

1. The risk of more than one rollover for DL RLC-SN is reduced.

However, it is not very clear how fast this can happen in a real network. Theoretically AMR frame timing is 20 msec and if one RLC PDU maps to one PDCP PDU then RLC-SN rollover maximum time is=20 msec×127=2.5 secs.

2. If 2 msec TTI is used then RRC: RB Setup complete can be sent faster and new configuration can become active faster.
Cons:

1. There is no relation between ciphering activation time and activation time. Two configurations become active at different times 2. UE must calculate accurate value for new config to be active i.e. not so long and not too short.

3. ASN.1 need to be modified

NOTE 1: Ciphering can be started by incrementing the HFN value at this stage. HFN value was not incremented, at this stage, during CS voice over DCH because CFN rollover could happen and this could lead to mismatch between count-c values maintained at UE and UTRAN. In order to avoid this possibility, HFN was not incremented for CS voice over DCH. However, for CS voice over HSPA, RLC-SN will always start from 0 and rollover can happen after 127 RLC-PDUs are received, the possibility of HFN value mismatch between UE and UTRAN is not present. But in order to provide consistency with CS voice over DCH, 3GPP might choose ciphering without incrementing HFN. Hence we would like to include both HFN increment and HFN not increment case to be included.

This application is based upon and claims the benefit of priority from United Kingdom Patent Application No. 0801825.1, filed on Jan. 31, 2008, the disclosure of which is incorporated herein in its entirety by reference.

The invention claimed is:

1. A method performed by a mobile communications node at a setup or a reconfiguration of a radio bearer, the method comprising:
    receiving a radio bearer setup message from a network communications node, the radio bearer setup message being applied in configuring the radio bearer within the mobile communications node to be able to communicate data with said network communications node;
    identifying an activation time value within the received radio bearer setup message;
    activating the radio bearer at the identified activation time;
    transmitting a radio bearer setup complete message confirming that the radio bearer has been setup and of communicating new cipher data for use in determining values of a cipher input parameter to be used for ciphering and deciphering data communicated with the network communications node;
    obtaining an uplink cipher activation time after the radio bearer setup message including a data rate defined for the radio bearer;
    before said transmitting the radio bearer setup complete message, starting to perform ciphering data to be transmitted by the radio bearer or deciphering data received by the radio bearer using values of said cipher input parameter determined using existing cipher data; and
    after said transmitting the radio bearer setup complete message, ciphering data to be transmitted by the radio bearer or deciphering data received by the radio bearer using second values of said cipher input parameter determined using said new cipher data.

2. A method according to claim 1, wherein said values of said cipher input parameter are determined using previous cipher data communicated with the network communications node prior to said receiving the radio bearer setup message.

3. A method according to claim 1, wherein, said new cipher data is transmitted with said radio bearer setup complete message.

4. A method according to claim 1, wherein said values of said cipher input parameter include a first transmit cipher parameter value for use in ciphering data to be transmitted and a first receive cipher parameter value for use in deciphering received data and wherein said second values of said cipher input parameter include a second transmit cipher parameter value for use in ciphering data to be transmitted and a second receive cipher parameter value for use in deciphering received data.

5. A method according to claim 1, wherein said uplink cipher activation defining defines when the mobile communications node starts to use the second transmit cipher parameter value for ciphering uplink data to be sent to the network communications node.

6. A method according to claim 5, wherein said obtaining includes calculating the uplink cipher, activation time.

7. A method according to claim 6, wherein said calculating calculates said uplink cipher activation time based on the data rate defined for the radio bearer and an estimated time for the network communications node to be ready to decipher the transmitted uplink data.

8. A method according to claim 7, wherein said data rate is defined in said radio bearer setup message.

9. A method according to claim 6, further comprising transmitting said calculated uplink cipher activation time to the network communications node.

10. A method according to claim 9, wherein said calculated uplink cipher activation time is transmitted to the network communications node with said radio bearer setup complete message.

11. A method according to claim 5, wherein said obtaining includes receiving the uplink cipher activation time from the network communications node.

12. A method according to claim 5, wherein said uplink cipher activation time is defined by a sequence number identifying an uplink data packet within a sequence of uplink packets.

13. A method according to claim 1, wherein the downlink cipher activation time defines when the mobile communications node starts to use the second receive cipher parameter value for deciphering downlink data received from the network communications node.

14. A method according to claim 13, wherein said obtaining includes calculating the downlink cipher activation time.

15. A method according to claim 14, wherein said calculating calculates said downlink cipher activation time based on the data rate defined for the radio bearer and an estimated time for the network communications node to be ready to cipher the downlink data.

16. A method according to claim 15, wherein said data rate is defined, in said radio bearer setup message.

17. A method according to claim 14, further comprising transmitting said calculated downlink cipher activation time to the network communications node.

18. A method according to claim 17, wherein said calculated uplink cipher activation time is transmitted to the network communications node with said radio bearer setup complete message.

19. A method according to claim 13, wherein said obtaining includes receiving the downlink cipher activation time from the network communications node.

20. A method according to claim 13, wherein said downlink cipher, activation time is defined by a sequence number identifying a downlink data packet within a sequence of downlink packets.

21. A method according to claim 1, wherein said new cipher data comprises a start value.

22. A method according to claim 1, wherein said mobile communications node applies different cipher data to calculate different cipher input parameters depending on whether the radio bearer setup complete message has been sent.

23. A method according to claim 22, wherein, said different cipher data comprise start values maintained by the mobile communications node.

24. A method according to claim 1, wherein said starting to perform ciphering data to be transmitted is performed at the identified activation time.

25. A method performed by a network communications node at a setup or a reconfiguration of a radio bearer, the method comprising:
- transmitting a radio bearer setup message to a mobile communications node, the radio bearer setup message being applied in configuring the radio bearer within the mobile communications node to be able to communicate data with said network communications node, the radio bearer setup message including an identification of an activation time;
- activating the radio bearer at the identified activation time;
- receiving a radio bearer setup complete message confirming that the radio bearer has been setup and of communicating new cipher data for use in determining a value of a cipher input parameter to be used for ciphering and deciphering data communicated with the network communications node;
- obtaining an uplink cipher activation time after the radio bearer setup message including a data rate defined for the radio bearer;
- before receiving the radio bearer setup complete message, starting to perform ciphering data to be transmitted by the radio bearer or deciphering data received by the radio bearer using values of said cipher input parameter determined using existing cipher data; and
- after receiving the radio bearer setup complete message, ciphering data to be transmitted by the radio bearer or deciphering data received by the radio bearer using second values of said cipher input parameter determined using said new cipher data.

26. A method according to claim 25, wherein the downlink cipher activation time defines when the network communications node starts to use the second transmit cipher parameter value for ciphering downlink data to be sent to the mobile communications node.

27. A method according to claim 26, wherein said obtaining includes calculating the downlink cipher activation time.

28. A method according to claim 27, wherein said calculating calculates said downlink cipher activation time based on the data rate defined for the radio bearer and an estimated time of when, the new cipher data will be available for determining the second transmit cipher parameter value.

29. A method according to claim 28, wherein said data rate is defined in said radio bearer setup message.

30. A method according to claim 27, further, comprising transmitting said calculated downlink cipher activation time to the mobile communications node.

31. A method according to claim 30, wherein said calculated downlink cipher activation time is transmitted to the mobile communications node with said radio bearer setup message.

32. A method according to claim 26, wherein said obtaining includes receiving the downlink cipher activation time from the mobile communications node.

33. A method according to claim 26, wherein said downlink cipher activation time is defined by a sequence number identifying a downlink data packet within a sequence of downlink packets.

34. A method, according to claim 25, wherein said uplink cipher activation time defines when the network communications node starts to use the second receive cipher parameter value for deciphering uplink data received from the mobile communications node.

35. A method according to claim 34, wherein said obtaining includes calculating the uplink cipher activation time.

36. A method according to claim 35, wherein said calculating calculates said uplink cipher activation time based on said data rate defined for the radio bearer and an estimated time of when the new cipher data will be available for determining the second receive cipher parameter value.

37. A method according to claim 36, wherein said data rate is defined in said radio bearer setup message.

38. A method according to claim 35, further comprising transmitting said calculated uplink cipher activation time to the mobile communications node.

39. A method according to claim 38, wherein said calculated uplink cipher activation time is transmitted to the mobile communications node with said radio bearer setup message.

40. A method according to claim 34, wherein said obtaining includes receiving the uplink cipher activation time from the mobile communications node.

41. A method according to claim 34, wherein said uplink cipher activation time is defined by a sequence number identifying an uplink data packet within a sequence of uplink packets.

42. A method performed by a mobile communications node at a setup or a reconfiguration of a radio bearer, the method comprising:
- using current cipher data to determine first values of a cipher input parameter for ciphering data to be transmitted by the radio bearer or for deciphering data received by the radio bearer, after an activation time for activating the radio bearer but before a transmission of a radio bearer setup complete message;
- obtaining an uplink cipher activation time after a radio bearer setup message including a data rate defined for the radio bearer; and
- using new cipher data to determine second, values of said cipher input parameter for ciphering data to be transmitted by the radio bearer or for deciphering data received by the radio bearer, after a determined cipher activation time.

43. A mobile communications node, comprising:
- first means for communicating a radio bearer setup message with a network communications node, the radio bearer setup message being applied in configuring the radio bearer within the mobile communications node to be able to communicate data with said network communications node;
- means for activating the radio bearer at a defined activation time;
- second means for transmitting a radio bearer setup complete message confirming that the radio bearer has been setup and for communicating new cipher data for use in generating values of a cipher input parameter for ciphering and deciphering data communicated with the network communications node; and ciphering means operable:
  between a time that said activating means activates the radio bearer and a time that said second means communicates said radio bearer setup complete message, to cipher data to be transmitted by the radio bearer or to decipher data received by the radio bearer using first values of said cipher input parameter;
  obtaining an uplink cipher activation time after the radio bearer setup message including a data rate defined for the radio bearer; and
  after said second means transmits said radio bearer setup complete message, to cipher data to be transmitted by the radio bearer or to decipher data received by the radio bearer using second values of said cipher input parameter determined using said new cipher data.

44. A mobile communications node, comprising:
  a transceiver operable to:
    receive a radio bearer setup message from a network communications node, the radio bearer setup message being applied in configuring a radio bearer within the mobile communications node to be able to communicate data with said network communications node;
    transmit a radio bearer setup complete message confirming that the radio bearer has been setup; and
    transmit new cipher data for use in generating values of a cipher input parameter to be used for ciphering and deciphering data communicated with the network communications node;
  a controller operable to identify an activation, time value within the received radio bearer setup message and to activate the radio bearer at the identified activation time; and
  a ciphering engine operable:
    to obtain an uplink cipher activation time after the radio bearer setup message including a data rate defined for the radio bearer;
    before said transceiver transmits said radio bearer setup complete message, to start to perform to cipher data to be transmitted by the radio bearer or to decipher data received by the radio bearer using first values of said cipher input parameter using determined existing cipher data; and
    after said transceiver has transmitted said radio bearer setup complete message, to cipher data to be transmitted by the radio bearer or to decipher data received by the radio bearer using second values of said cipher input parameter determined using said new cipher data.

45. A non-transitory computer-readable storage medium encoded with a computer product comprising computer implementable instructions for causing a programmable computer device to perform the method of claim 1.

* * * * *